United States Patent [19]

Cohen et al.

[11] 4,447,127

[45] May 8, 1984

[54] LOW LOSS SINGLE MODE FIBER

[75] Inventors: Leonard G. Cohen; Wanda L. Mammel, both of Holmdel; Dietrich Marcuse, Lincroft, all of N.J.

[73] Assignee: Bell Telephone Laboratories, Incorporated, Murray Hill, N.J.

[21] Appl. No.: 367,094

[22] Filed: Apr. 9, 1982

[51] Int. Cl.³ .............................................. G02B 5/172
[52] U.S. Cl. ................................................. 350/96.33
[58] Field of Search ............... 350/96.29, 96.30, 96.33

[56] References Cited

U.S. PATENT DOCUMENTS

| 3,997,241 | 12/1976 | Nishida et al. | 350/96.33 |
| 4,184,744 | 1/1980 | Onoda et al. | 350/96.33 |
| 4,185,890 | 1/1980 | Onoda et al. | 350/96.33 |
| 4,300,930 | 11/1981 | Chang | 350/96.30 |
| 4,412,722 | 11/1983 | Carnevale et al. | 350/96.31 |

OTHER PUBLICATIONS

Irven et al., *Proc. 7th European Conf. on Optical Communication*, Copenhagen, Denmark, Sep. 8–11, 1981, "Dispersion Characteristics of Practical Single Mode Fibers", pp. 4.3–1 to 4.3–4.

Ainslie et al., *Proc. 7th European Conf. on Optical Communication*, Copenhagen, Denmark, Sep. 8–11, 1981, "The Reproducible Fabrication of Ultra Low Loss Single Mode Fibre", pp. 2.5–1 to 2.5–4.

Andreev et al., *Electronics Letters*, vol. 17, No. 12, Jun. 11, 1981, "Experimental Study of Single-Mode W-Type Optical Fibre", pp. 416–417.

Kawakami et al., *Proc. IEE*, vol. 123, No. 6, Jun. 1976, "Transmission Characteristics of W-Type Optical Fibres", pp. 586–590.

Irven et al., *Proc. 7th European Conference on Optical Communication*, Copenhagen, Denmark, Sep. 8–11, 1981, "Single Mode Fiber Reproducibility", pp. 2.4–1 to 2.4–4.

*Primary Examiner*—John D. Lee
*Assistant Examiner*—Frank Gonzalez
*Attorney, Agent, or Firm*—Sylvan Sherman

[57] ABSTRACT

In a double-clad, single mode fiber with depressed inner cladding, reduced losses at the longer wavelengths are realized when the ratio of the radius of the inner cladding to the radius of the core is at least 6.5 to 1.

4 Claims, 8 Drawing Figures

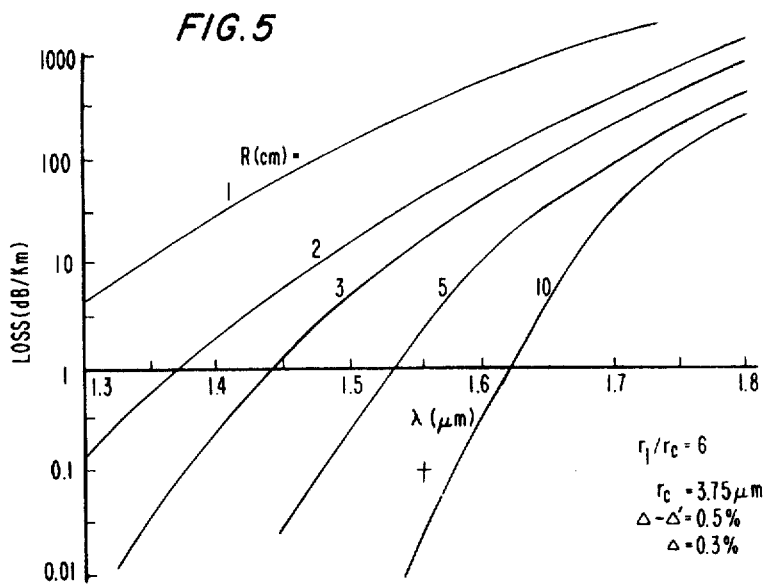
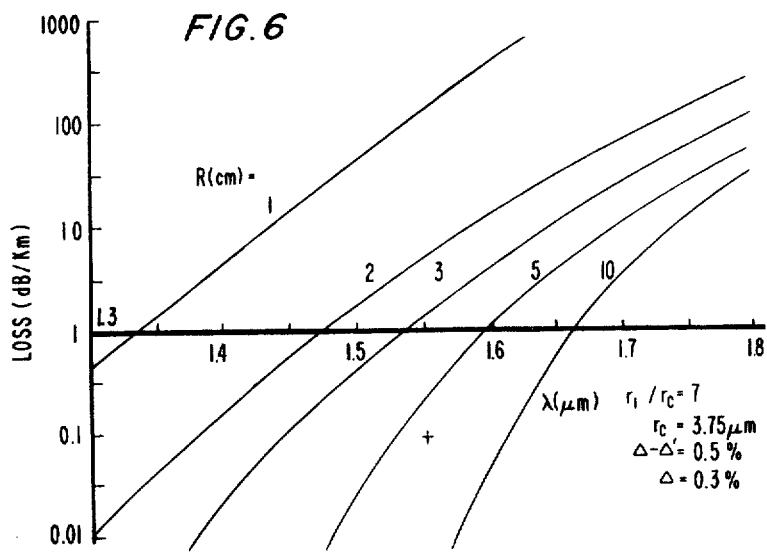

LOW LOSS SINGLE MODE FIBER

TECHNICAL FIELD

This invention relates to single mode optical fibers.

BACKGROUND OF THE INVENTION

Optical fibers can be designed for single mode operation at specified wavelengths such as 1.3 μm or 1.55 μm. However, in order to be suitable for use in long distance, high bit rate transmission systems, a single mode fiber must also have low Rayleigh scattering losses, low bending-induced losses, and low chromatic dispersion. Recent experimental studies have indicated that a step-index fiber, with a germanium doped 7.5 μm core diameter, a 110 μm silica cladding diameter and an index difference Δ=0.5 percent, provides very low loss and very good resistance to bending-induced (i.e., cabling) loss. However, minimum dispersion occurs near 1.35 μm, which is too far removed from the preferred operating wavelength of 1.3 μm. In this regard germania-fluoro-phosphosilicate depressed-index cladding lightguides are attractive alternative structures because the germania dopant used to increase the core index serves to increase the zero material dispersion wavelength, whereas the fluorine used to decrease the cladding index has the effect of decreasing the material dispersion at the longer wavelengths such as 1.55 μm. As a result, the contributions to chromatic dispersion by the two dopant materials can be counterbalanced, and the total chromatic dispersion can be minimized at any wavelength within the desired range between 1.28 and 1.38 μm, for core diameters between 6 μm and 10 μm. Therefore, fiber waveguide parameters, such as core diameter and index difference, can be chosen to minimize losses, whereas dispersion effects can be minimized by choosing the proper dopant concentrations.

It has been observed, however, that depressed-index-cladding lightguides have high losses at the longer wavelengths. Thus, a lightguide designed to operate at 1.3 μm could not be useful at 1.55 μm. As a result, the use of a 1.3 μm fiber in any system would limit the ability of the system to grow by simultaneous operation at both 1.3 μm and at some longer wavelength such as 1.55 μm.

SUMMARY OF THE INVENTION

The present invention is based upon the discovery of the loss mechanism operative in a single mode, depressed cladding fiber. Fibers of this type comprise a core region of index $n_c$ surrounded by a first, inner cladding of index $n_1$ and a second, outer cladding of index $n_2$ where $n_c > n_2 > n_1$. In accordance with the invention, the high loss region at the longer wavelengths is moved out of the useful range by making the ratio of the radii of the first cladding and core equal to or greater than 6.5:1.

Silica fibers co-doped with germania in the core and fluorine in the cladding have attracted attention because they can be built to satisfy low dispersion requirements at any wavelength in the 1.28–1.38 μm range. By making the cladding to core ratio 8:1, in accordance with the present invention, losses of less than 0.1 dB/km for wavelengths less than 1.6 μm can be obtained.

BRIEF DESCRIPTION OF THE DRAWING

FIGS. 5–8 include sets of curves showing the effect of bends on the fiber losses.

DETAILED DESCRIPTION

Figure 1:
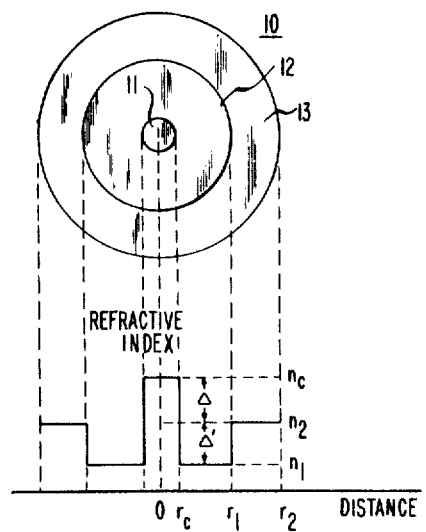
FIG. 1 shows the cross section of a double-clad optical fiber.

Referring to the drawings, FIG. 1 shows the cross section of a double-clad, single mode optical fiber 10 comprising a core region 11 of radius $r_c$ and refractive index $n_c$ surrounded by a first, inner cladding 12 of radius $r_1$ and index $n_1$, and a second outer cladding 13 of radius $r_2$ and index $n_2$. FIG. 1 also shows the manner in which the refractive indices vary as a function of distance from the center of the fiber. Of particular interest is the so-called "depressed cladding" fiber wherein the refractive index of the inner cladding is less than the index of both the core and the outer cladding. That is $$n_c > n_2 > n_1 \quad (1)$$

The fractional differences Δ and Δ' between the core and the second cladding, and between the first and second claddings are given by $$\Delta = \frac{n_c - n_2}{n_2}, \text{ and} \quad (2)$$

$$\Delta' = \frac{n_2 - n_1}{n_2}. \quad (3)$$

This particular index configuration is preferred over the simpler, single-clad step-index profile for a number of reasons. As indicated hereinabove, by using a combination of germanium as an index increasing dopant in the core, and fluorine as an index decreasing dopant in the inner cladding, the total chromatic dispersion can be minimized at any wavelength within the desired range between 1.28 μm and 1.38 μm for any fiber core diameter between 6 μm and 10 μm. In addition, the same total core to cladding index difference (Δ+Δ') can be obtained with a lower dopant concentration in the core, thus reducing losses due to Rayleigh scattering.

However, depressed index cladding lightguides have been observed to have high losses at the longer wavelengths. The present invention is based upon the discovery of the mechanism responsible for that loss.

Central to an understanding of this mechanism is the notion of cut-off of the fundamental HE$_{11}$ mode. A mode is said to be guided when its field outside of the fiber core decays exponentially as a function of radial distance. On the other hand, the modal field can form a radial traveling wave in the outer cladding after an initial exponential decay near the core. When this happens, the mode is said to be cut-off. Thus, as used herein, the term "cut-off" does not imply that power cannot be transmitted along the fiber. It simply means that, because the power is not totally trapped within the lightguide, some power can leak out and be lost by the process of radiation.

Figure 2:
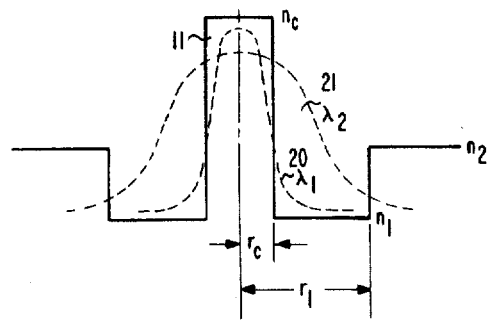
FIG. 2 shows the index profile of the fiber shown in FIG. 1.

In a simple step-index fiber (i.e., $\Delta'=0$) the wave energy does not become cut-off even at arbitrarily long wavelengths. This is due to the fact that the refractive index of the core is greater than that of the surrounding claddings for signals of all wavelengths within the range of signal wavelengths of interest. By contrast, in a depressed cladding fiber of the type illustrated in FIG. 1 the effective index of the fiber tends to decrease as the signal wavelength increases until a value of effective index is reached which is less than that of the outer cladding. When this occurs, the fiber is cut-off with respect to that wavelength and longer wavelength signals. The reason this occurs is illustrated in FIG. 2 which shows the index profile of a depressed cladding fiber and the signal field distribution for two wavelengths $\lambda_1$ and $\lambda_2$ where $\lambda_2 > \lambda_1$.

At the shorter wavelength $\lambda_1$, the field is concentrated in the core region 11, as illustrated by curve 20. For this field distribution, the effective index is close to that of the core region and is greater than the index $n_2$ of the outer cladding. For the longer wavelength signal $\lambda_2$, the field is not as tightly bound to the core but has spread into the region of the inner cladding 12, as illustrated by curve 21. Because the index of the inner cladding is less than that of both the core and the outer cladding 13, the effective index at the longer wavelengths tends to decrease and eventually reaches a value that is less than $n_2$. More particularly, the effective index $n_e$ is given by $$n_e = \frac{\lambda}{\lambda_g} \quad (4)$$

where $\lambda$ is the plane wavelength of the signal in free space, and $\lambda_g$ is the modal wavelength of said signal in the fiber.

If $n_e$ is greater than $n_2$, there are no radiation losses. However, when $n_e$ becomes smaller than $n_2$, the signal radiates through the cladding and is said to be cut-off.

An approximate formula for radiative power loss, $2\alpha$, in a double clad fiber with a wide depressed cladding is given by $$2\alpha = \frac{2\pi k^2 \gamma \sigma e^{-2\gamma r_1}}{\beta k^2 n_2^2 |\Delta'| V^2 |K_1(\lambda r_c)|^2} \quad (5)$$

where
$K_1 = [n_2^2(1 + \Delta)^2 k^2 - \beta^2]^{\frac{1}{2}}$ $k = 2\frac{\pi}{\lambda}$ $\beta = 2\frac{\pi}{\lambda_g}$ $\gamma = [\beta^2 - n_2^2(1 - \Delta')^2 k^2]^{\frac{1}{2}}$
$\sigma = (n_2^2 k^2 - \beta^2)^{\frac{1}{2}}$
and
$V = k r_c n_2 [2(\Delta + \Delta')]^{\frac{1}{2}}$.

Equation (5) is valid for loss values of practical interest. It becomes invalid when radiation losses are already intolerably high.

Figure 3:
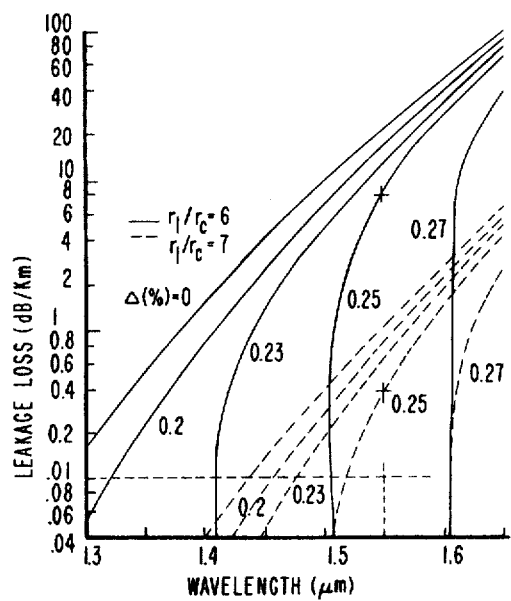
FIG. 3 shows two sets of radiative leakage loss curves for different cladding-to-core ratios.

FIG. 3 shows two sets of radiative leakage loss curves calculated as a function of wavelength for a family of silica fibers comprising a germanium-doped core of radius 3.75 $\mu$m, and a fluorine-doped first cladding. The total index difference between core and cladding for such a system is typically 0.5% (i.e., $|\Delta| + |\Delta'| = 0.5\%$). The solid line family of curves shows the losses when the ratio of cladding-to-core, $r_1/r_c$, is equal to 6 for different values of $\Delta$. For example, when $\Delta = 0\%$, the index of the core and outer cladding are equal and the effective index, $n_e$, is less than $n_2$ at all low wavelengths. Thus, losses increase rapidly with wavelength. As $\Delta$ increases (i.e., the index of the second cladding decreases relative to the core), the losses, as a function of wavelength, are less.

The broken line curves show a similar variation as a function of $\Delta$. However, because of the larger ratio $r_1 : r_c$, the losses are lower overall.

Figure 4:
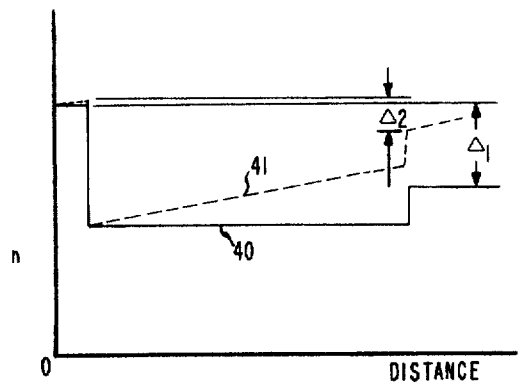
FIG. 4 shows the effect of bends on the index profile.

If a loss of 0.1 dB/km is established as the maximum tolerable loss, this occurs at a wavelength of 1.55 $\mu$m when $\Delta$ is approximately 0.26% for a ratio $r_1 : r_c$ of either 6 or 7. However, these curves are somewhat misleading to the extent that they are descriptive of straight fibers. If the effects of bending are taken into account, the loss picture changes dramatically due to the distortion of the effective fiber profile. Specifically, if a fiber with an index profile represented by the solid line curve 40 in FIG. 4 is bent, the effective index profile is deformed, as shown by the dashed curve 41. As a result, the effective value of $\Delta$ is reduced from its straight fiber value of $\Delta_1$ to its bent fiber effective value of $\Delta_2$. For example, if the effective $\Delta$ is reduced from 0.26 to 0.25, the losses at 1.55 $\mu$m increase from 0.1 dB to approximately 8 dB for a fiber having an $r_1 : r_c$ ratio of 6, but only to about 0.4 dB for a fiber having a ratio of 7. This illustrates quite clearly the importance of the cladding-to-core ratio. The preferred value of this ratio depends upon a number of practical considerations. In order to facilitate splicing, it is desirable that the core diameter be no smaller than 7.5 to 8 $\mu$m. In order that the fiber be single mode at 1.3 $\mu$m, $\Delta$ should be no greater than 0.5%. And, finally, to insure that the Rayleigh scattering losses do not become too large, $\Delta'$ is advantageously made less than 0.4%. Taking these constraints into consideration, one can then obtain a series of curves, of the type shown in FIGS. 5-8, which show the loss as a function of wavelength for different radii of curvature. For example, the set of curves shown in FIG. 5 are for $r_c = 3.75$ $\mu$m; $r_1 : r_c = 6$; $|\Delta| + |\Delta'| = 0.5\%$; and $\Delta = 0.3\%$. At $\lambda = 1.55$ $\mu$m, the losses reach 0.1 dB/km for a radius of curvature of approximately 9 cm. If, for the $\Delta$, $\Delta'$, and $r_c$, the ratio $r_1 : r_c$ is increased to 7, the radius of curvature can be reduced to about 6 $\mu$m, for the same loss at 1.55 $\mu$m.

Figure 7:
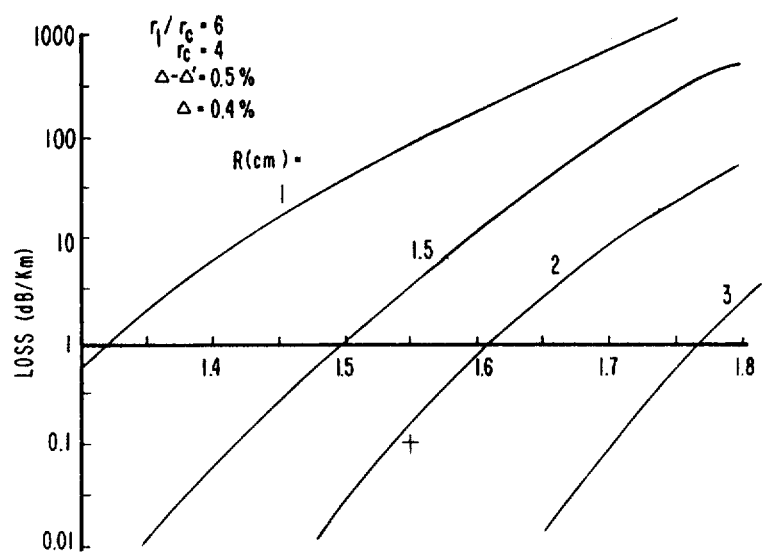
Figure 8:
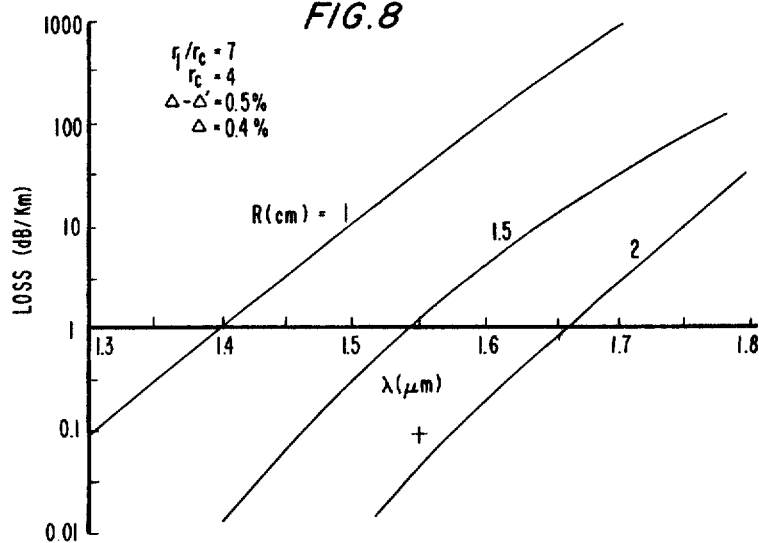

FIGS. 7 and 8 show a similar set of curves for a fiber with a slightly larger core radius of 4 $\mu$m, which serves to guide the light more lightly, and a $\Delta$ of 0.4%, which is an increase in the difference between the core and the second cladding indices. Both of these serve to reduce the bending losses, or, conversely, permit a small radius of curvature for the same loss.

One can generate a variety of curves of this sort. What becomes apparent when this is done is that for a single mode fiber to operate over the range between $\lambda = 1.3$ and 1.55 $\mu$m, the ratio of the radii of the first cladding and the fiber core is important and, in particular, should exceed at least 6.5 in order to keep bending losses low.

In addition to the two active waveguiding cladding layers, there may be additional layers of material which are by-products of the method of manufacture, or are included for reasons unrelated to the waveguiding function of the fiber. Unlike the two optically active claddings, which are designed to have very low losses at the wavelengths of interest, such additional layers may be lossy at these wavelengths. For example, if the MCVD process is employed, the outermost cladding will be surrounded by the preform starting tube which, while made of silica, typically has high losses. Other layers may include a barrier layer to prevent migration of OH-radicals into the core region. However, by making the second cladding layer thick enough, these additional claddings do not affect the lightguide characteristics of the fiber and can be ignored for the purposes of the present invention.

What is claimed is:

1. A single mode fiber comprising:

an inner core region having a refractive index $n_c$ and a radius $r_c$ surrounded by a first, inner cladding having a refractive index $n_1$ and an outer radius $r_1$, and a second, outer cladding having a refractive index $n_2$, where $n_1 < n_2 < n_c$; and the ratio $r_1:r_c$ is at least 6.5:1.

2. The fiber according to claim 1 wherein the fractional difference $\Delta$ between the refractive index of the core and the second cladding, given by $$\Delta = \frac{n_c - n_2}{n_2},$$

and the fractional difference $\Delta'$ between the refractive indices of the first and second claddings, given by $$\Delta' = \frac{n_2 - n_1}{n_2},$$

are such that $$|\Delta| + |\Delta'| = 0.5 \text{ percent}.$$

3. The fiber according to claim 2 wherein $\Delta \leq 0.4$ percent.

4. The fiber according to claim 1 where said fiber is single mode over the range of wavelengths greater than 1.3 μm.

* * * * *